Figure 1:
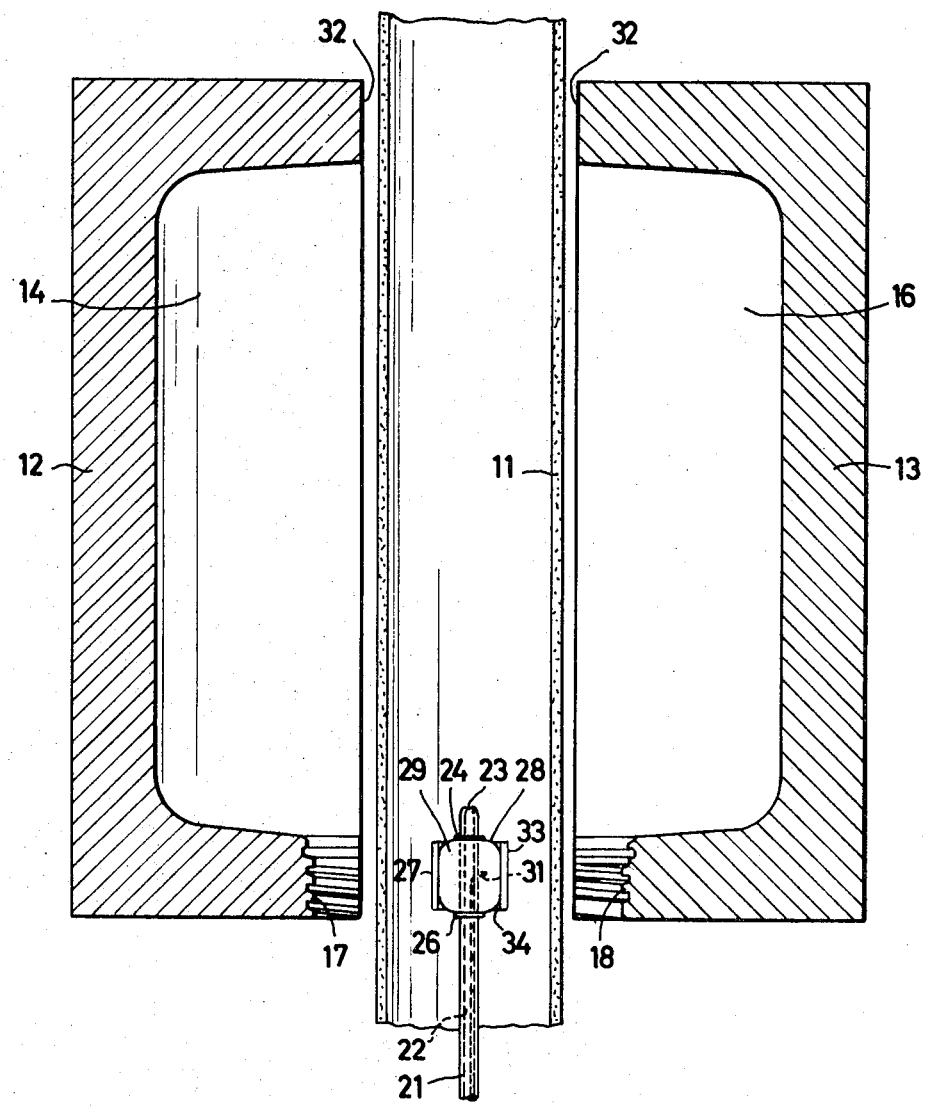

United States Patent [19]

Schiemann

[11] 3,861,851

[45] Jan. 21, 1975

[54] APPARATUS FOR MOULDING THE NECK OF AN EXTRUDED HOLLOW BODY

[76] Inventor: Wolfram Schiemann, 17 Eugen-Nagele-Strasse, 714 Ludwigsburg, Germany

[22] Filed: July 17, 1973

[21] Appl. No.: 380,004

Related U.S. Application Data

[62] Division of Ser. No. 206,042, Dec. 8, 1971, Pat. No. 3,792,140.

[52] U.S. Cl........ 425/503, 425/517, 425/DIG. 206, 425/DIG. 215, 425/390
[51] Int. Cl........................ B29c 17/07, B29d 3/02
[58] Field of Search........ 425/503, 517, 519, 326 B, 425/387 B, 390, DIG. 206, DIG. 214, DIG. 215, DIG. 216; 264/98, 99, 278, 296, 314

[56] References Cited
UNITED STATES PATENTS

| | | | |
|---|---|---|---|
| 3,032,823 | 5/1962 | Sherman | 264/98 |
| 3,164,646 | 1/1965 | Fischer | 264/98 |
| 3,272,896 | 9/1966 | Winchester, Jr. | 425/387 B |
| 3,384,923 | 5/1968 | Rownd et al. | 425/326 B |

OTHER PUBLICATIONS

"Insecticide Tank," A photograph and Caption in Modern Plastics, Vol. 37; Dec. 1959, pg. 96.

Primary Examiner—Al Lawrence Smith
Assistant Examiner—K. J. Ramsey

[57] ABSTRACT

An upwards moving mandrel passes through an outlet hole in the bottom of a pair of blow moulding dies. The mandrel carries two externally inflatable and deflatable bubbles. The first bubble carries a metal reinforcing ring which is positioned in the neck during blow moulding and retained there. The second bubble tears open the end of the extruded tube after it has been turned inward into the hollow body and presses it to adhere against the inner wall of the body.

7 Claims, 6 Drawing Figures

APPARATUS FOR MOULDING THE NECK OF AN EXTRUDED HOLLOW BODY

This is a division of application Ser. No. 206,042 filed Dec. 8, 1971, now U.S. Pat. No. 3,792,140 which issued Feb. 12, 1974.

The invention relates to an apparatus for moulding the wall of the neck area of an extruded hollow body, comprising an extruder for producing a tube of thermo plastic material, die sections which are arranged below the extruder, can be moved up to and away from one another and compress the extrudate in the section lying opposite the neck of the hollow body and in the vicinity of the neck when the mould is closed, an opening in the mould corresponding to said neck, a rod-shaped mandrel which extends through the opening for blow moulding, and a central body on the mandrel against which bears the inner face of the outlet.

The neck of the container is subjected to a great variety of stresses irrespective of whether the neck has a screw cap fastening, a claw fastener as on jerry cans, or the like. These stresses apply, particularly but not exclusively, to wide-neck cans, bowls, vacuum flasks, etc. The neck of such a container is so wide that a hand can be inserted therein. The diameter of such a neck would usually be in the region of 7-10cm. In contrast to metal articles, those materials from which hollow bodies can be blow-moulded have substantially less rigidity. Therefore during stress there is a tendency for sections of the neck to be forced inwards so that the fastening is no longer satisfactory and perhaps even leaky.

As a remedial measure, it is known practice to provide a supporting ring in wide necks. In the case of necks having a smaller diameter, such supporting rings cannot be provided for reasons of space. These supporting rings are slightly tapered on the inside and fit over the front section of a mandrel for blow moulding. The mandrel is moved directly into the mould until the supporting ring bears against the inner wall of the fastening. The container is then blow-moulded, the mandrel withdrawn again, and the ring slips down from its conical support. Since the ring is made of a plastics material, it can be welded to the still hot material of the container.

It is a disadvantage that the ring itself forms the inner wall of the nozzle so that all liquids flow over it. In addition to its supporting properties, it must therefore have certain chemical properties in regard to food-stuffs; it should not be corroded by fuel, etc. Since it has to be made of a material which can be welded to the hot extrudate of the hollow body, the supporting ring can only be made of plastics material. However, plastics material has basically poorer rigidity than metal. Finally it is also a disadvantage that cracks can form on the dividing face between the reinforcing ring and the blow-moulded wall of the neck, which cracks can collect undesirable sediment and give rise to leakage.

Finally these containers can only be emptied with difficulty because the inner face of the reinforcing ring lies vertically to the direction of outflow and therefore causes turbulence.

The problem underlying the invention is to provide an apparatus and a method whereby all of the aforementioned disadvantages can be avoided, and whereby in particular the neck of the hollow body can have a substantially greater load capacity and a reinforcing ring, which is used if necessary, can be arrranged in the wall of the neck without being visible from the outside.

This problem is solved in accordance with the invention in that some distance from the central body there is fastened an externally inflatable and deflatable bubble through which the mandrel passes, the outer circumference of said bubble when in a non-inflated position being substantially smaller than the internal diameter of the finished neck, in that there is provided a pressure device which forces the lower end of the tube in front of the bubble against the mandrel, and in that the bubble can be inflated at about the level of the neck when the mandrel is inserted and the hollow body already blowmoulded until the outer cover of the bubble bears against the inner wall of the hollow body at least in a double wall section.

Figure 2:
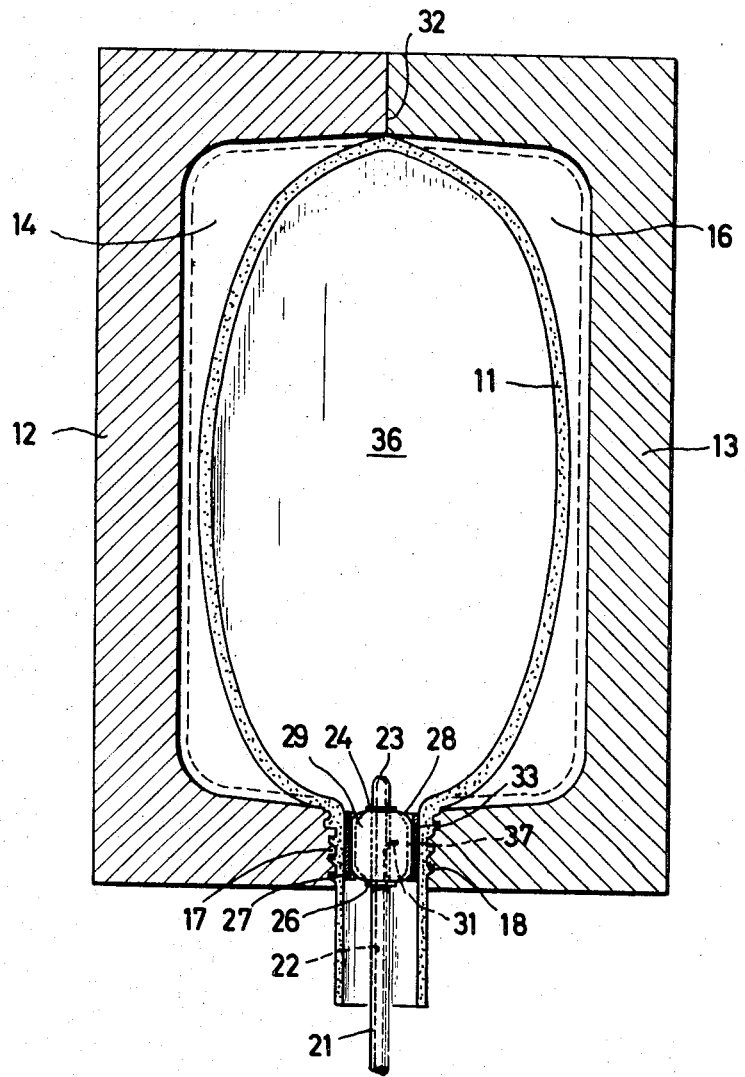
Figure 3:
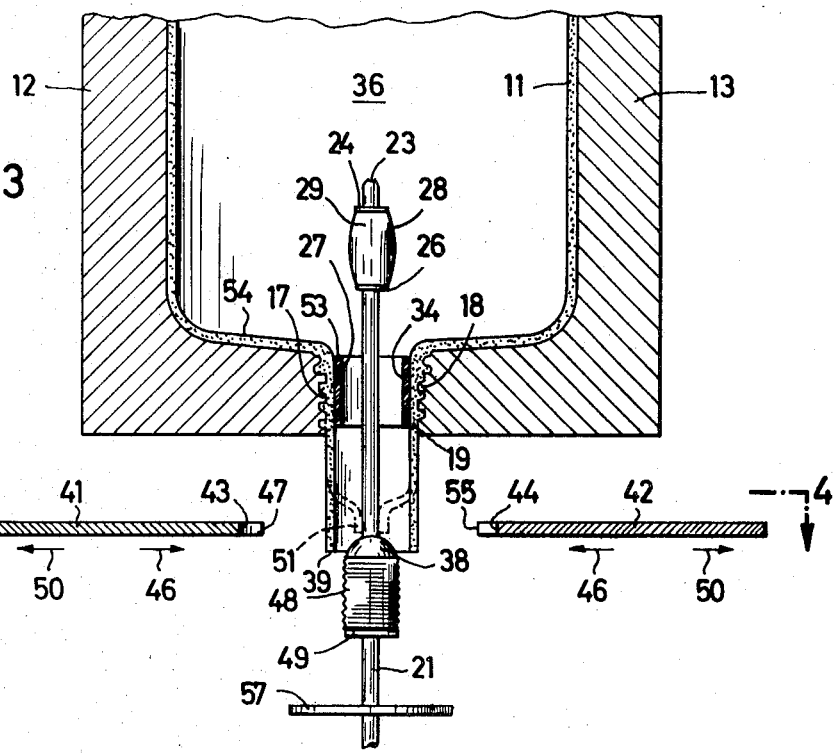
Figure 4:
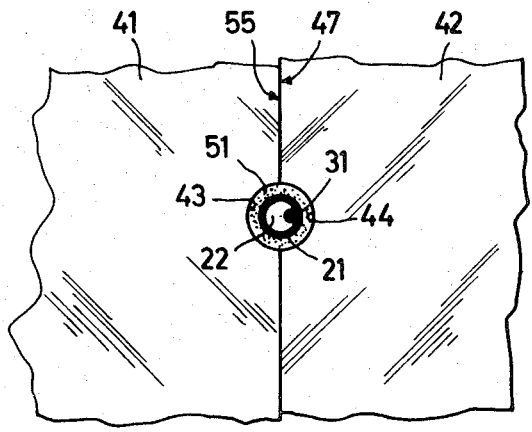
Figure 5:
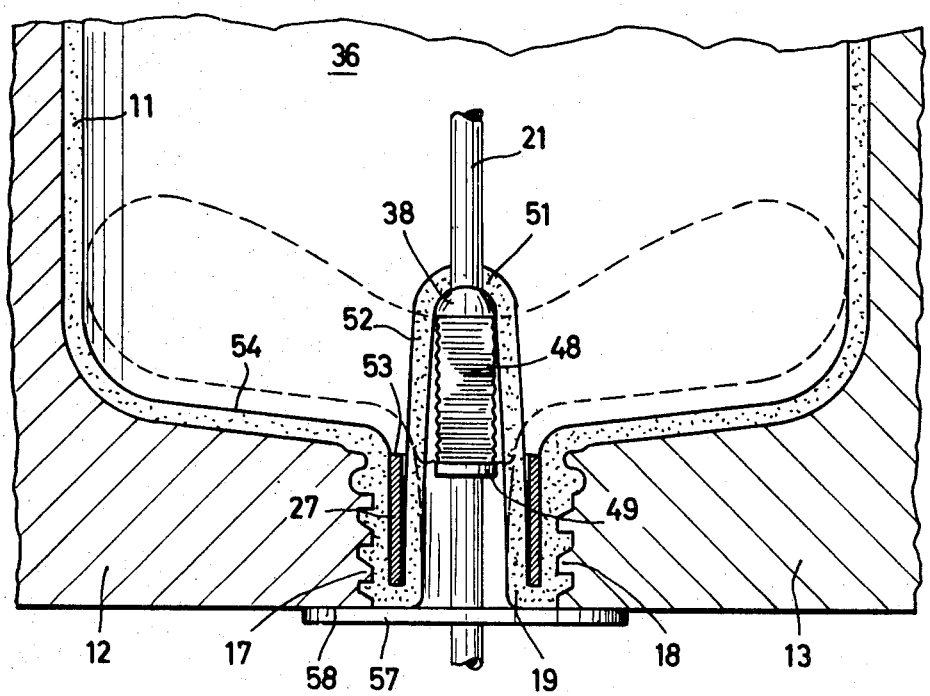
Figure 6:
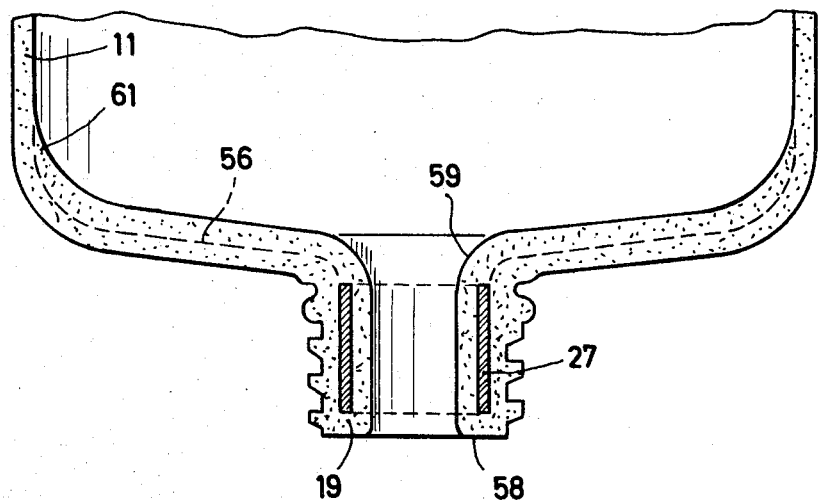

Other advantages and features of the invention are shown in the following description of a preferred embodiment. In the drawings:

FIG. 1 shows a diagrammatic and partially cut-away cross-section, not true to scale, through a blow mould, a tube of extrudate and a mandrel in a first working cycle, FIG. 2 shows a view similar to FIG. 1, with a second working cycle shown by continuous lines and a third working cycle by broken lines, FIG. 3 shows a view of a fourth working cycle in continuous lines and a fifth working cycle in broken lines, FIG. 4 shows a section along the line IV—IV in FIG. 3, FIG. 5 shows a sixth working cycle in continuous lines and a seventh working cycle in broken lines, and FIG. 6 shows a cross-section through the neck of an extruded finished hollow body.

An extrusion head (not shown) is provided above FIG. 1 and produces a tube 11 of hot thermo plastic material of circular cross-section. As is known practice in the blow moulding of hollow bodies, this tube 11 is not continuously produced. In effect a given length of extrudate is produced and then the blow-moulding operation commences when the tube is suspended. The material used for the tube 11 does not differ from the materials used for such purposes. The mould is likewise similar and consists of two halves 12, 13. The halves 12, 13 can therefore be moved horizontally away from and towards one another. When the halves are closed, their cavities 14, 16 combine into a form which is subsequently acquired by the hollow body. As is normal practice, the threads 17, 18 are produced at the bottom of the die sections 12, 13. The preferred embodiment has a trapezoidal thread which is subsequently located on the outer face of the neck 19. However, the halves 12, 13 could also be shaped in this section so that the fastener may be secured subsequently at this point in the manner of a jerry can fastener or some other neck is formed. The only previous difference from prior art is that the tube 11 extends substantially further below the die sections, 12, 13.

A mandrel or sleeve 21 has a channel 22 for the passage of air and its free end comprises an outlet 23 for the air used in blow moulding. Slightly below the outlet 23 there are provided two circular plates 24 and 26 which are axially spaced from one another and extend perpendicular to the mandrel 21, said plates being rigidly attached to the mandrel 21 and having a diameter which is substantially smaller than the internal diameter of a circular reinforcing ring 27. As shown in the drawings, the spacing between the plates 24, 26 is slightly greater than the height of the reinforcing ring 27. The outer circumference 28 of a pneumatically operated bubble 29, a first expandable means, supports the reinforcing ring 27 which runs around the circumference and lies coaxially with the mandrel 21. The bubble can be filled with air from outside with the aid of a channel 31. Because of the plates 24, 26 the bubble expands perpendicular to the plane of the drawing in FIG. 1 and holds the reinforcing ring 27 rigid. The reinforcing ring 27 is mounted on the uninflated bubble 29 outside the apparatus and then brought into the position shown in FIG. 1 in which the reinforcing ring 27 is on a level with the neck 19 to be subsequently formed and is located in such a position where its longitudinal axis lies in the dividing plane between the die sections 12, 13. The reinforcing ring 27 is made of metal and its circumference can be roughened. However, metal rings can also be used as obtained in an injection-moulded condition or cut off conventional tubular sections.

The die sections 12, 13 are then moved towards one another so that the upper pressure faces 32 nip the tube 11 in a known manner and, as shown by the continuous lines in FIG. 2, it is suspended in the cavity 14, 16. During this movement the threads 17, 18 also press the tube 11 in the corresponding section against the outer circumference 33 of the reinforcing ring 27 which is however not moved away from its position because its inner circumference 34 is always retained by the outer circumference 28 of the bubble 29. At the same time tubular extrudate is also pressed into threads 17, 18 so that the trapezoidal thread is formed at this point. Air is then blown into the formed hollow space 36 with the aid of the mandrel 21 so that the tube bears against the inside of the die sections 12, 13. This is shown by the broken lines. Naturally the hollow body can also have a different shape. Its neck 19 can also be arranged on the side of the hollow body or staggered in some other way.

The bubble 29 is then deflated and returns to the outer form 37 shown by broken lines in FIG. 2. The reinforcing ring 27 is therefore only retained by forces of adhesion or similar forces of the material which is compressed to form the neck 18 and is fully released from the bubble 29.

The bubble 29 could also be replaced by a rubber body, the equator of which could be extended by moving the plates 24, 26 towards one another. In addition the reinforcing ring 27 could also be held by fingers which may be moved inwards and outwards radially to the mandrel 21. It would also be possible to use resilient or spring-like members which may be tensioned or released in a radial direction.

The mandrel 21 is then moved further into the hollow space 36 together with plates 24, 26 and the bubble 29 until the round face of the body 38 which is mushroom-shaped and rigidly connected to the mandrel 21 lies on a level with the lower edge 39 of the tube 11. The lower edge 39 naturally does not constitute the lower edge of the entire tube 11, but only the lower edge of that section which is suspended below the threads 17, 18, i.e. only the section which is not compressed. Two pressure plates 41, 42 can be horizontally moved substantially perpendicular to the mandrel 21 in a similar manner to the die sections 12, 13. The guiding and operating means necessary for this purpose is not shown in the drawings. The pressure plates 41, 42 have open-edged recesses 43, 44 in the form of circular segments which, after moving in the direction of the arrows 46, combine to form a circle, the diameter of which is equal to the diameter of the mandrel 21 plus the thickness of the tubular extrudate. If the pressure plates 41, 42 are fully moved towards one another in the direction of the arrows 46, then their edges 47, 55 nip more tubular material and, as in the case of the top of a bag, the recesses 43, 44 force the tubular material above the body 38 against the shaft of the mandrel 21 to which the tubular material continues to adhere. In this connection folds or creases are certainly formed, but they are harmless and may be subsequently smoothed out.

The tube above the edge 39 could also be fastened as in the case of a bag in a different manner to that shown in the drawings. A ribbon-shaped loop which is tightened or the like could be used for example. If the pressure plates 41, 42 are located in the position shown in FIG. 4, the edge 39 is slightly raised. Then the pressure plates 41, 42 are moved in the direction of the arrows 50 and returned to their starting positions and the mandrel 21 is moved further inwards into the hollow space 36 until a second means, bubble 48, is located in the neck 19. The bubble 48 can be alternately inflated or deflated from outside by a second channel (not shown). It is located between the body 38 and a plate 49, both of which are rigidly attached to the mandrel 21. As a result of the inward movement the tip 51 is turned inwards, as shown in FIG. 5. Pressure is then exerted on the bubble 48 which tears open the tip 51 during its expansion. The tip 51 can also be slightly torn open to lighten the bubble 48, the body 38 and the mandrel 21 being moved into the hollow space 36 until the tip 51 is torn open. This is also facilitated by the spherical shape of the body 38. When the bubble 48 is expanded, as shown by the broken lines in FIG. 5, the material 52 is pressed against the inner face 53 on the inner circumference 34 of the reinforcing ring 27 and against the inner section 54 above the neck 19 and firmly welded thereto while still hot. Therefore the operations have to follow one another in sufficiently rapid succession. The dividing faces 56 between the same materials are shown in FIG. 6. It can also be seen in FIG. 6 that the material above the neck 19 is advantageously thickened thereby, and even doubled in thickness.

The dimensions are selected so that during the operation as shown in FIG. 5 the outer face 58 is also simultaneously pressed by a pressure plate 57, which is rigidly secured perpendicular to the mandrel 21, so that flat surfaces are obtained at this point which are necessary for sealing purposes. The pressure plate 57 can also act as a stop and limit the path of insertion of the mandrel 21.

The bubble 48 is deflated again, returned to its original shape and the mandrel 21 fully withdrawn. The die sections 12, 13 open again and the finished hollow body can be ejected.

As can be seen in FIG. 6, the reinforcing ring 27 is fully enclosed by thermoplastic material, is invisible from the outside and no gaps or cracks are formed which can be penetrated by a medium from outside. The neck 19 is smooth on its inner side and advantageously curved in the vicinity of the inner rim 59 for flow purposes. This due to the fact that, when inflated the bubble 48 does not assume an angular form, but always assumes rounded shapes. Therefore the tip 51 also subsequently leads almost directly into the tapering wall 61.

What is claimed is:

1. Apparatus for moulding the wall of the neck section of an extrudate hollow body, comprising
    an extruder for producing a tube of thermoplastic material,
    mould sections arranged below the extruder which can be moved up to and away from one another and compress the tube in the vicinity of the neck when the mould is closed, said mould sections having an opening corresponding to the neck,
    a rod-shaped mandrel which passes through the opening for blow moulding,
    first and second expandable means on said mandrel,
    said first expandable means being adapted to bear against an inner face at the neck,
    said second expandable means comprising externally expandable and contractable means through which the mandrel passes secured spaced from the first expandable means, the outer circumference of said second expandable means, when contracted, being substantially smaller than the internal diameter of the finished neck,
    means for inserting said mandrel into said tube to a first position at which said first expandable means is about on a level with said neck and to a second position at which said second expandable means is about the level of said neck,
    a pressure device which presses the lower end of the tube in front of said second expandable means against the mandrel when the mandrel is inserted and the hollow body already blow-moulded,
    means for expanding said second expandable means at about the level of the neck until the outer cover of said second expandable means bears against an inner wall of the hollow body.

2. Apparatus as claimed in claim 1, in which said first expandable means is designed as a supporting means for a reinforcing ring, the outer circumference of the supporting means being increased and reduced from the outside.

3. Apparatus as claimed in claim 2, in which the supporting means comprises a rubber body which can be compressed in the longitudinal direction of the mandrel and the outer circumference of which is therefore curved outwards.

4. Apparatus as claimed in claim 2, in which the supporting means comprises a pneumatically inflatable bubble.

5. Apparatus as claimed in claim 1, in which the pressure device comprises two pressure plates each of which has a recess for receiving the mandrel and the material of the lower end of the tube.

6. Apparatus as claimed in claim 1, in which in front of said second expandable means there is provided a mushroom-shaped body which opens the pressed lower end of the tube when the mandrel is moved a distance into the hollow body.

7. Apparatus as claimed in claim 6, in which said pressure device gathers together the lower end of the tube in front of the mushroom-shaped body in the same manner as the top of a bag.

* * * * *